United States Patent
Larsen et al.

(10) Patent No.: US 9,765,547 B2
(45) Date of Patent: Sep. 19, 2017

(54) NODE STRUCTURES FOR LATTICE FRAMES

(71) Applicant: Vestas Wind Systems A/S, Aarhus N. (DK)

(72) Inventors: Gerner Larsen, Hinnerup (DK); Niels Christian Olsen, Tjele (DK)

(73) Assignee: MHI Vestas Offshore Wind A/S, Aarhus N (DK)

( * ) Notice: Subject to any disclaimer, the term of this patent is extended or adjusted under 35 U.S.C. 154(b) by 0 days.

(21) Appl. No.: 14/407,002

(22) PCT Filed: Jun. 7, 2013

(86) PCT No.: PCT/DK2013/050179
§ 371 (c)(1),
(2) Date: Dec. 10, 2014

(87) PCT Pub. No.: WO2013/185770
PCT Pub. Date: Dec. 19, 2013

(65) Prior Publication Data
US 2015/0152664 A1    Jun. 4, 2015

Related U.S. Application Data

(60) Provisional application No. 61/657,850, filed on Jun. 10, 2012.

(30) Foreign Application Priority Data

Jul. 2, 2012  (DK) ................................. 2012 70387

(51) Int. Cl.
*E04H 12/00*  (2006.01)
*E04H 12/08*  (2006.01)
(Continued)

(52) U.S. Cl.
CPC ......... *E04H 12/085* (2013.01); *B21C 37/296* (2013.01); *E02B 17/0004* (2013.01);
(Continued)

(58) Field of Classification Search
CPC ....... E04H 12/10; E04H 12/085; E04H 12/34; E04B 1/1903; E02B 17/027;
(Continued)

(56) References Cited

U.S. PATENT DOCUMENTS

| | | | | |
|---|---|---|---|---|
| 2,189,201 A | * | 2/1940 | Flader | E04B 1/585 219/137 R |
| 3,814,891 A | * | 6/1974 | Agrati | B21D 53/86 219/67 |

(Continued)

FOREIGN PATENT DOCUMENTS

| | | |
|---|---|---|
| DE | 2415743 A1 | 10/1975 |
| EP | 2067914 A2 | 6/2009 |

(Continued)

OTHER PUBLICATIONS

International Searching Authority, International Search Report and Written Opinion, issued in corresponding International Application No. PCT/DK2013/050179, dated Oct. 2, 2013, 12 pages.

(Continued)

*Primary Examiner* — Patrick J Maestri
(74) *Attorney, Agent, or Firm* — Wood Herron & Evans LLP

(57) ABSTRACT

A node structure (12, 14) for connecting two or more convergent members (16, 26) of a lattice frame to each other and to one or more other members of the lattice frame. The node structure (12, 14) comprises a pair of opposed spaced-apart faces (30) that are substantially planar and substantially parallel to each other. At least one pair of root formations (32) with respective central longitudinal axes (Continued)

define an interior angle between them, those axes diverging outwardly for alignment with respective members of the lattice frame and converging inwardly between the faces (30). An inner connecting wall (34) between the root formations (32) of the pair connects concave-curved inner edges (36) of the faces and extends in a concave curve around the interior angle to join the root formations (32) of that pair.

24 Claims, 9 Drawing Sheets

(51) Int. Cl.
    *B21C 37/29* (2006.01)
    *E02B 17/00* (2006.01)
    *E04H 12/10* (2006.01)
    *E02B 17/02* (2006.01)
    *E04B 1/19* (2006.01)
    *E04H 12/34* (2006.01)
    *F03D 13/20* (2016.01)

(52) U.S. Cl.
    CPC .......... *E02B 17/027* (2013.01); *E04B 1/1903* (2013.01); *E04H 12/10* (2013.01); *E04H 12/34* (2013.01); *F03D 13/20* (2016.05); *E02B 2017/0091* (2013.01); *F05B 2240/9121* (2013.01); *Y02E 10/728* (2013.01)

(58) Field of Classification Search
    CPC ........... E02B 17/004; E02B 2017/0091; F03D 11/04; F05B 2240/9121; Y02E 10/728
    See application file for complete search history.

(56) References Cited

U.S. PATENT DOCUMENTS

| | | | | |
|---|---|---|---|---|
| 4,092,077 A | * | 5/1978 | George | E04B 1/585 403/178 |
| 4,197,028 A | * | 4/1980 | George | B63B 9/065 403/208 |
| 4,829,739 A | * | 5/1989 | Coppa | B64G 9/00 403/171 |
| 5,435,110 A | | 7/1995 | Stol et al. | |
| 5,884,686 A | * | 3/1999 | Wood | E04B 1/1903 164/235 |
| 6,056,240 A | | 5/2000 | Hagenlocher | |

FOREIGN PATENT DOCUMENTS

| | | |
|---|---|---|
| WO | 0151741 A1 | 7/2001 |
| WO | 2010147481 A1 | 12/2010 |

OTHER PUBLICATIONS

Danish Patent and Trademark Office, Danish Search Report issued in corresponding Danish Application No. PA 2012 70387, dated May 2, 2013, 4 pages.

* cited by examiner

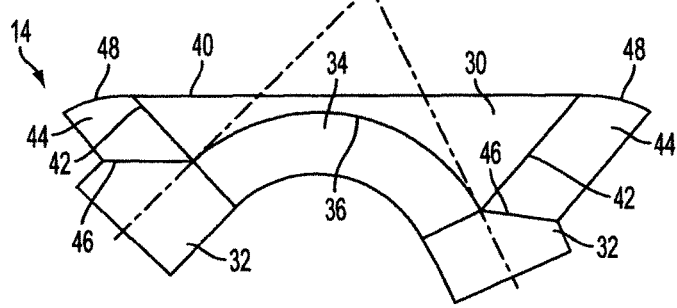
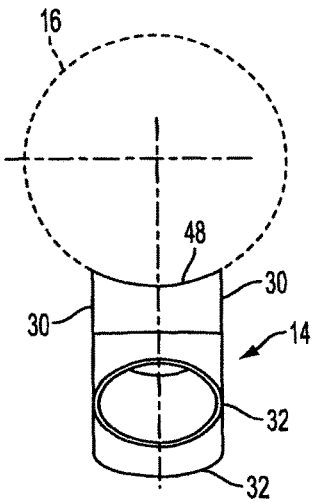
FIG. 4(a)　　　　　　FIG. 4(b)
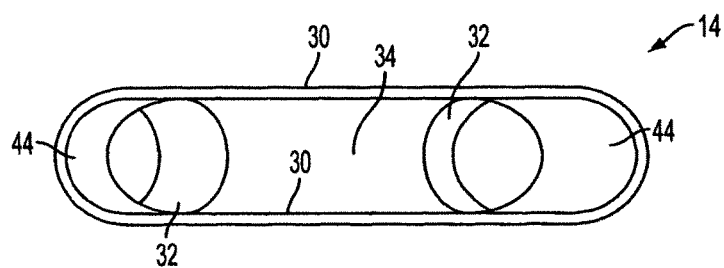
FIG. 4(c)

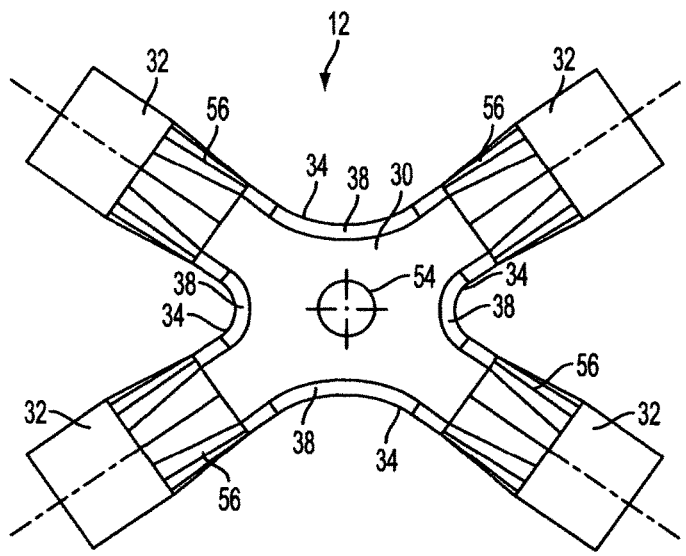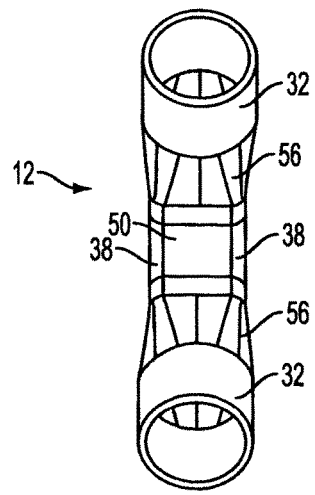
FIG. 8(a)   FIG. 8(b)
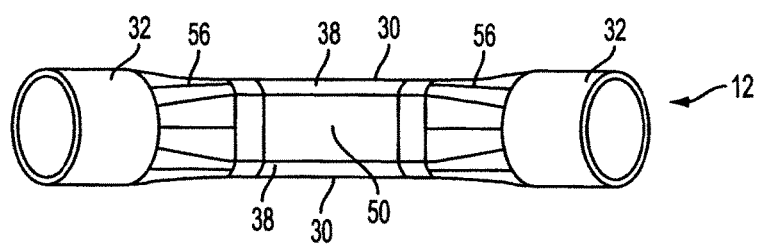
FIG. 8(c)
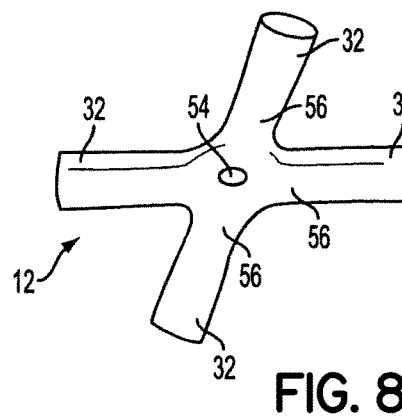
FIG. 8(d)

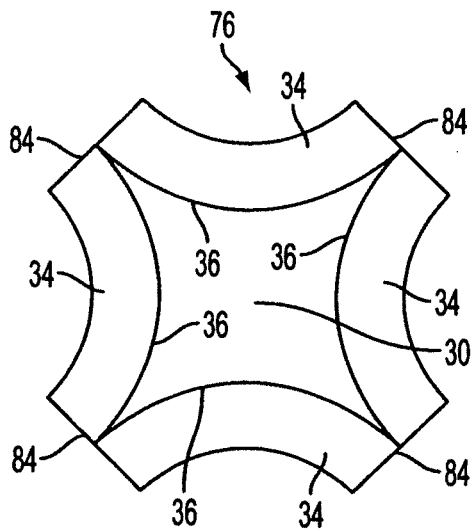
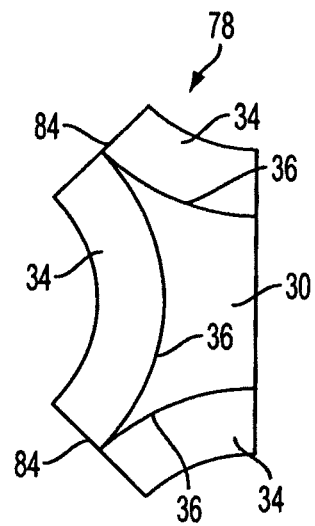
FIG. 15(a)  FIG. 15(b)
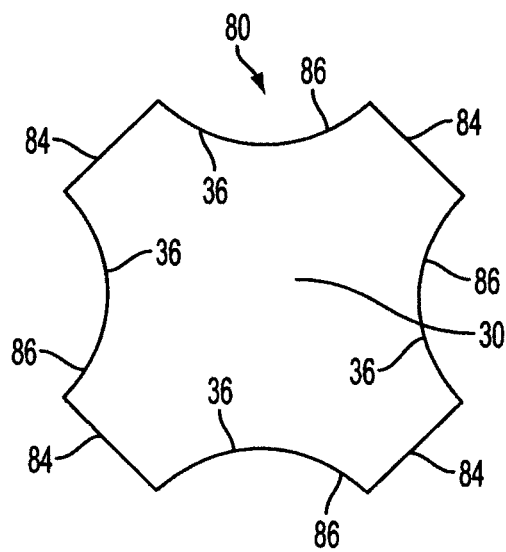
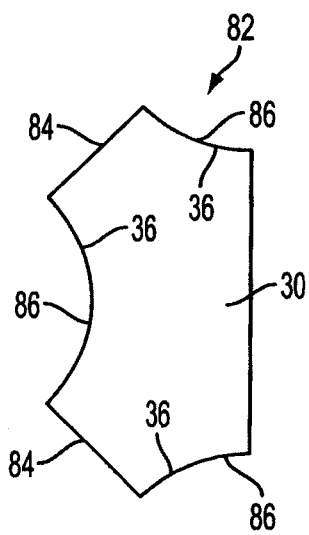
FIG. 16(a)  FIG. 16(b)

NODE STRUCTURES FOR LATTICE FRAMES

TECHNICAL FIELD

This invention relates to node structures for lattice frames and to methods for their fabrication.

BACKGROUND

Lattice frames comprise elongate members, usually tubes, that lie on intersecting longitudinal axes and may be joined by node structures where those axes intersect. Such node structures may be cast in one piece or may be fabricated from parts by welding.

An example of a lattice frame is a 'jacket' substructure for a wind turbine or other offshore structure, which will be used to exemplify the invention in the description that follows. Jackets have been used in the oil and gas industry for many years; they have recently also found favour in offshore wind turbine applications where water depth in excess of about twenty meters makes it impractical to use a traditional monopile or gravity-based substructure.

A jacket for an offshore wind turbine is shown in FIG. 1. The jacket 10 shown in FIG. 1 is of conventional overall shape that reflects the prior art but includes various node structures 12, 14 in accordance with the invention, which will be described in detail later with particular reference to FIGS. 3 to 9.

In the example shown in FIG. 1, the jacket 10 comprises four upwardly-converging tubular legs 16 that collectively define a truncated four-sided pyramid of square horizontal cross-section. A three-sided pyramid of tripod configuration is also possible, in that case having a triangular horizontal cross-section.

The legs 16 of the jacket 10 will seat into a pre-piled foundation structure (not shown) that is fixed to the seabed, in water whose depth is potentially in excess of thirty meters. The jacket 10 is tall enough to protrude above the surface so that a tubular wind turbine tower may be mounted on top, clear of the water. For this purpose, the jacket 10 is surmounted by a transition piece 20 as shown in FIG. 2 for supporting the wind turbine tower and for providing a working platform around its base.

FIG. 1 shows that each face of the pyramidal jacket 10 comprises a series of cruciform X-braces 22 of downwardly-increasing size, disposed between upper and lower horizontal struts 24 that extend between adjacent pairs of legs 16. Each X-brace 22 comprises four tubular diagonal struts 26 that converge inwardly to connect at a central X-node structure 12 and diverge outwardly toward respective K-node structures 14 that each connect two diagonal struts 26 of a face of the jacket 10 to the legs 16. K-node structures 14 may be described as double-K node structures where they connect four diagonal struts 26 to the associated leg 16, i.e. two struts 26 each from adjacent faces of the jacket 10.

The uppermost and lowermost nodes on each leg 16 may be regarded as Y-node structures 28 as they connect only one diagonal strut 26 to the associated leg 16, although again a Y-node structure may be described as a double-Y node structure where two diagonal struts 26 from adjacent faces of the jacket 10 connect to the associated leg 16. However, the Y-node structures 28 are akin to K-node structures 14 as they also connect the horizontal struts 24 to the legs 16.

It is important for a node structure of a lattice frame to minimise stress concentrations. It is also desirable for a node structure to be compact for low material cost and to minimise resistance to water movement due to waves and tides, which imparts lateral loads to the jacket structure.

If the node structure is to be fabricated, it is desirable for that node structure to be easy to fabricate in various locations around the world from readily-available materials and with minimal tooling cost. However, whilst preferred aspects of the invention relate to fabricated node structures, other aspects relate to shape features that are independent of the means of manufacture and so may be embodied in a non-fabricated node such as a cast node.

SUMMARY OF THE INVENTION

From one aspect, the invention resides in a node structure for connecting two or more convergent members of a lattice frame to each other and to one or more other members of the lattice frame, the node structure comprising: a pair of opposed spaced-apart faces that are substantially planar and substantially parallel to each other; at least one pair of root formations with respective central longitudinal axes defining an interior angle between them, those axes diverging outwardly for alignment with respective members of the lattice frame and converging inwardly between the faces; and an inner connecting wall disposed between the root formations of the, or each, pair that connects concave-curved inner edges of the faces and extends in a concave curve around the interior angle to join the root formations of that pair.

In the case of an X-node structure 12, any two (or three) of the four diagonal struts 26 of an X-brace 22 may be regarded as two or more convergent members of a lattice frame, in which case the other two (or one) of the four diagonal struts 26 of that X-brace 22 may be regarded as one or more other members of the lattice frame. In the case of a K-node structure 14 or a Y-node structure 28, any two or more horizontal struts 24 and/or diagonal struts 26 may be regarded as two or more convergent members of a lattice frame, in which case a leg 16 may be regarded as one other member of the lattice frame.

The inventive concept extends to a method of fabricating a node structure for a lattice frame, the method comprising connecting a pair of opposed spaced-apart faces with a concave-curved connecting wall by joining the connecting wall to concave-curved edges of the faces.

The invention also encompasses a lattice frame comprising at least one node structure of the invention or as made in accordance with the method of the invention, a wind turbine installation comprising such a lattice frame, and a wind farm comprising one or more of such a wind turbine installations.

Various optional features of the invention are set out in the appended sub-claims.

Node structures in accordance with the invention are compact, with low water resistance, and are simple to fabricate from readily-available materials with minimal tooling requirements. Their shape distributes loads effectively, optimises weight and provides an advantageously large weld area without being overly sensitive to welding tolerances. In particular, a large welding area on the jacket leg helps to reduce the thickness of the leg and hence the weight and cost of the jacket as a whole.

BRIEF DESCRIPTION OF THE DRAWINGS

In order that the invention may be more readily understood, reference will now be made, by way of example, to the accompanying drawings, in which:

FIGS. 4(a), 4(b) and 4(c) are a selection of views of a K-node structure like that shown in FIG. 3;

FIGS. 8(a), 8(b), 8(c) and 8(d) are a selection of views of a K-node structure like that shown in FIG. 3;

FIGS. 15(a) and 15(b) are schematic plan views showing, respectively, an X-node structure and a K-node structure being variants within the inventive concept; and FIGS. 16(a) and 16(b) are schematic plan views showing, respectively, an X-node structure and a K-node structure being further variants within the inventive concept.

DETAILED DESCRIPTION

Figure 1:
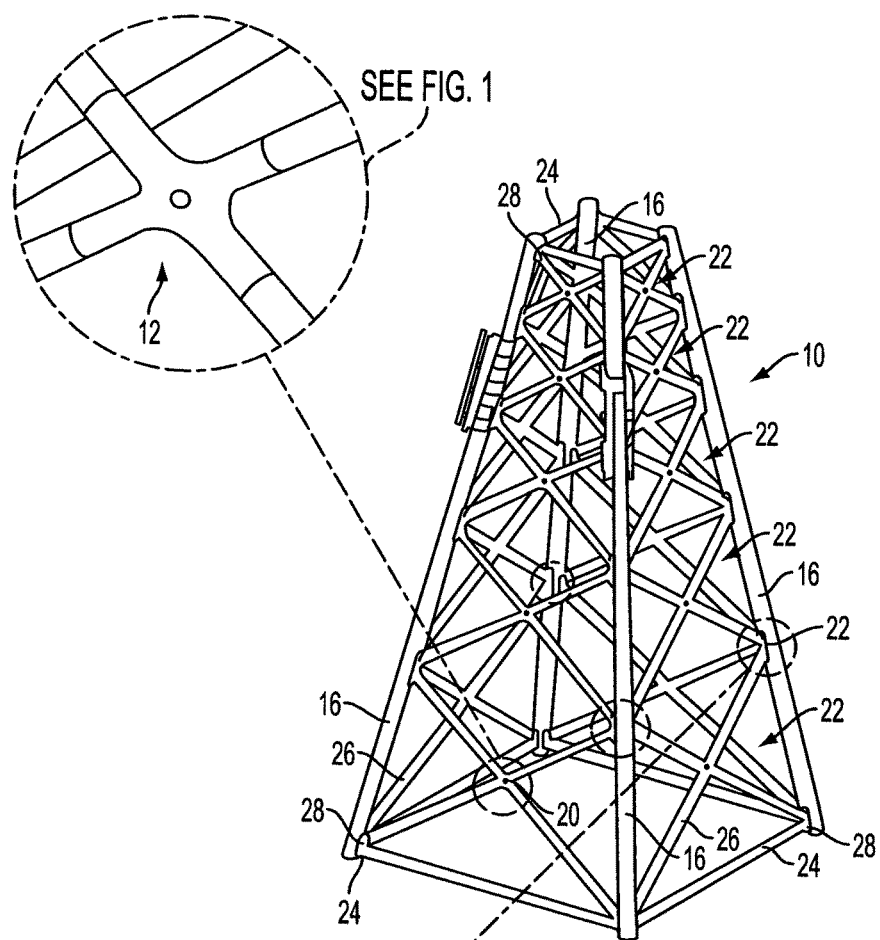
FIG. 1 is a perspective view of a lattice-type jacket substructure for an offshore wind turbine with its associated foundation structure, the jacket comprising various node structures in accordance with the invention, two of which are shown enlarged in FIG. 1 and are further illustrated in FIGS. 3 to 9.
Figure 2:
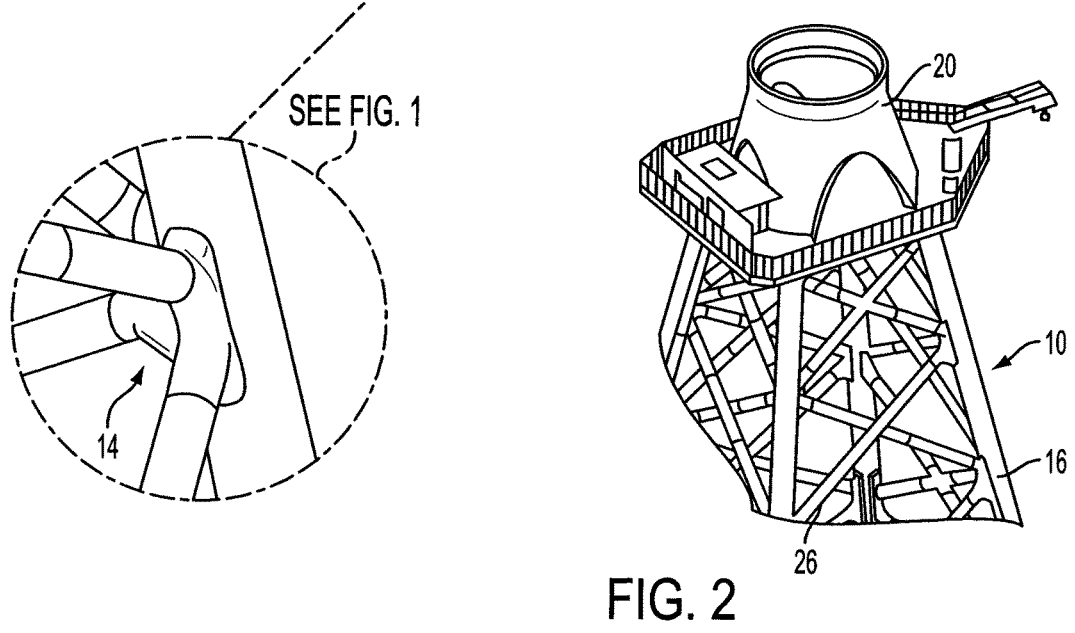
FIG. 2 is a perspective view of a transition piece atop the jacket of FIG. 1.
Figure 3:
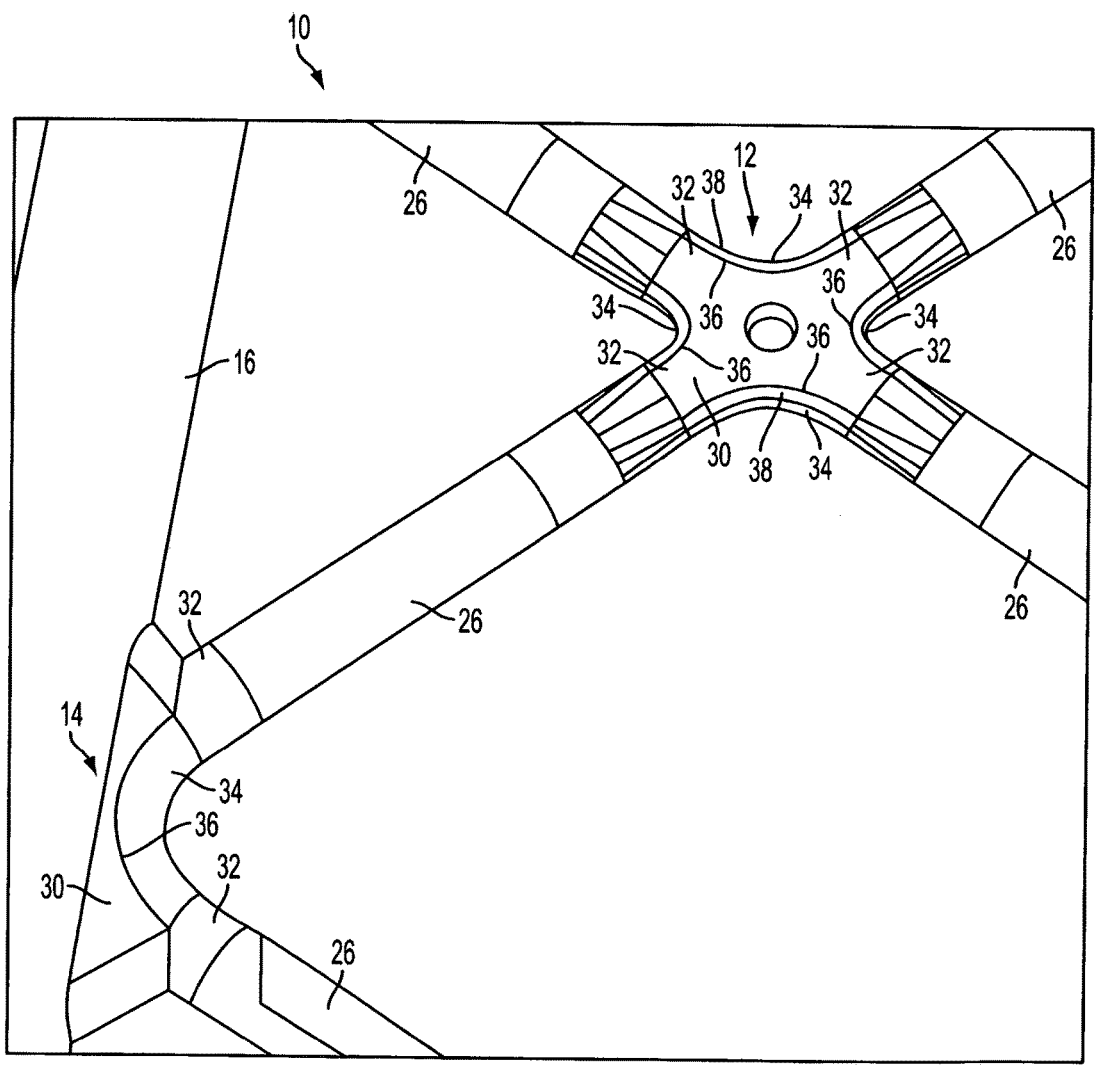
FIG. 3 is a perspective view of an X-node structure and a K-node structure in accordance with the invention, being part of the jacket of FIG. 1.

Reference has already been made to FIGS. 1 and 2 to put the invention into context. Referring next, then, to FIG. 3 of the drawings, this shows a K-node structure 14 and an X-node structure 12 of the lattice-frame jacket 10 shown in FIG. 1.

The K-node structure 14 connects a tubular leg 16 of the jacket 10 to two tubular diagonal struts 26 of X-braces 22 shown in FIG. 1. K-node structures 14 and similar Y-node structures 28 will be described with reference to FIGS. 4 to 7 of the drawings. Conversely, the X-node structure 12 connects four diagonal struts 26 of an X-brace 22 in a cruciform arrangement, without connecting those struts 26 to a leg 16 of the jacket 10. An X-node structure 12 will be described with reference to FIGS. 8 to 14. Further K-node and X-node variants will be described with reference to FIGS. 15 and 16.

The K-node structure 14 and the X-node structure 12 shown in FIG. 3 and further shown in FIGS. 4 to 9 have several features in common in conceptual terms. Each node structure 12, 14 has a pair of opposed spaced-apart faces 30 that are substantially planar and substantially parallel to each other. Also, each node structure 12, 14 has one or more pairs of root formations for alignment with respective struts 26, in this case protruding tubular root formations 32 with respective central longitudinal axes defining an interior angle between them. The faces 30 are substantially parallel to a plane containing the central longitudinal axes of the root formations 32.

The central longitudinal axes of the tubular root formations 32 converge inwardly between the faces 30 and diverge outwardly in alignment with respective struts 26. An inner connecting wall 34 between the root formations 32 of each pair connects concave-curved inner edges 36 of the faces 30 and extends in a concave curve around the interior angle to join the root formations 32 of that pair.

The concave curvature of the inner connecting wall 34 follows a generally elliptical path between the root formations 32 although the exact curvature is not essential to the invention and could be parabolic or hyperbolic, for example.

The concave-curved inner connecting wall 34 of each node structure 12, 14 comprises double-curved parts of convex cross-section that extend around the interior angle and are bounded by the concave-curved inner edges 36 of the faces 30. More specifically, the K-node structure 14 has an inner connecting wall 34 of semi-circular cross-section extending between the faces 30, with a radius of cross-sectional curvature the same as that of the root formations 32. Conversely, the X-node structure 12 has inner connecting walls 34 each with two portions 38 of quarter-circular cross-section, each portion 38 adjoining a concave-curved inner edge 36 of one of the faces 30.

References in this specification to concave or convex curvature assume that the reader's viewpoint is outside the node structure.

To discuss the K-node structure 14 in more detail, specific reference will now be made to FIGS. 4 to 7 of the drawings. FIGS. 4(a) to 4(c) and FIGS. 6 and 7 show details of the K-node structure 14 shown in FIG. 3. FIGS. 5(a) to 5(d) show a Y-node structure 28 that is like the K-node structure 14 but is used to connect a diagonal strut 26 and a horizontal strut 24 at the top and bottom of the lattice-frame jacket 10 and so has a narrower internal angle between the tubular root formations. The Y-node structure 28 may be regarded as a K-node structure 14 for the purposes of this specification; like numerals are used for like parts.

It will be seen that each face 30 in FIGS. 4 to 7 of the drawings further comprises a straight outer edge 40 opposed to the concave-curved inner edge 36, and straight end edges 42 each diverging from the concave-curved inner edge 36 to the outer edge 40.

In addition to the inner connecting walls 34, the faces 30 are also connected by end connecting walls 44 outboard of the root formations 32. Each end connecting wall 44 has a convex semi-circular cross-section extending between the faces 30, between an inner edge 46 adjoining a root formation 32 and an outer edge 48 in continuity with the outer edges 40 of the faces 30. The radius of cross-sectional curvature of the end connecting walls 44 is the same as that of the root formations 32.

Figure 5A:
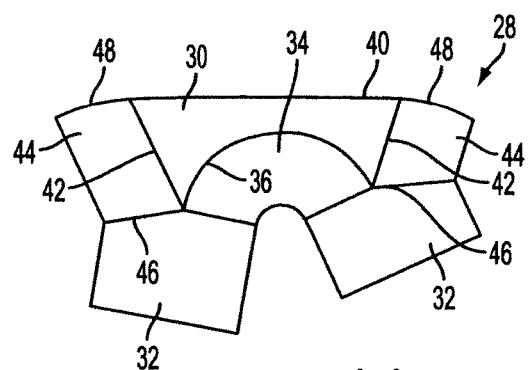
FIGS. 5(a), 5(b), 5(c) and 5(d) are a selection of views of a variant of the K-node structure shown in FIG. 4, suitable for use as a Y-node.
Figure 5B:
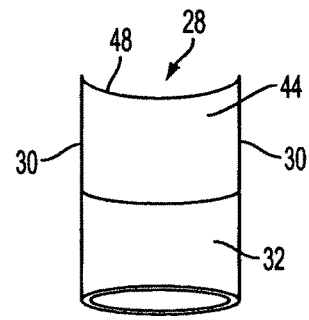
Figure 5C:
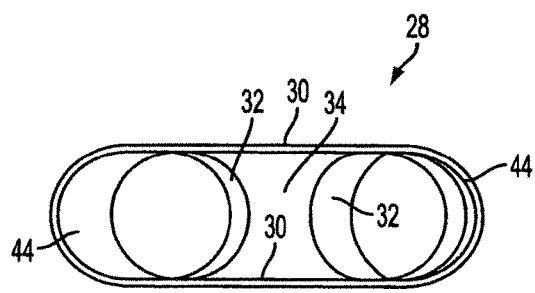
Figure 5D:
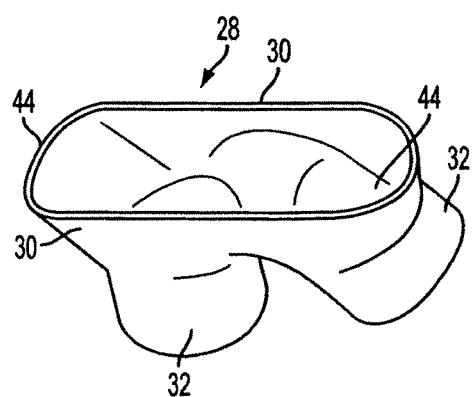

FIGS. 4(b) and 5(b) show that a cylindrical seat recess is defined between the outer edges 40 of the faces 30 and the outer edges 48 of the end connecting walls 44, which recess is shaped to attach the node structure to a leg 16 of the jacket 10. For this purpose, the seat recess has a central longitudinal axis generally parallel with the planes of the faces 30.

A leg 16 of the jacket 10 is shown in cross section in dashed lines in FIG. 4(b), received in the seat recess. FIG. 4(a) shows that the central longitudinal axes of the tubular root formations 32 intersect on the central longitudinal axis of the leg 16. This is advantageous for efficient load-bearing.

Figure 6:
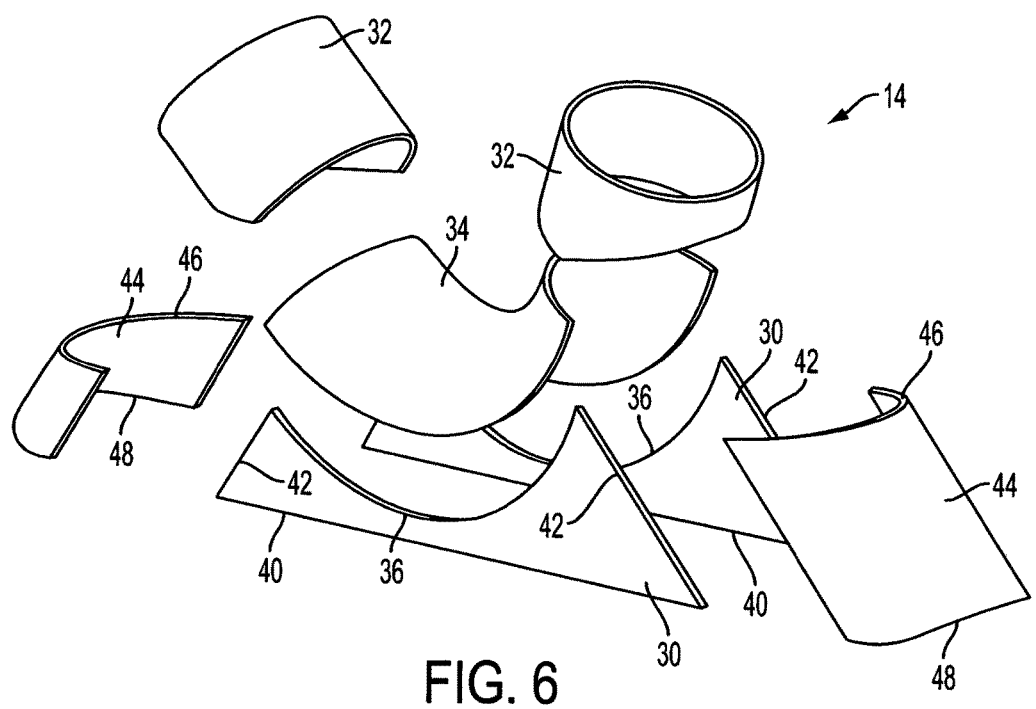
FIG. 6 is an exploded perspective view of the K-node structure of FIGS. 4(a), 4(b) and 4(c), showing its component parts.
Figure 7:
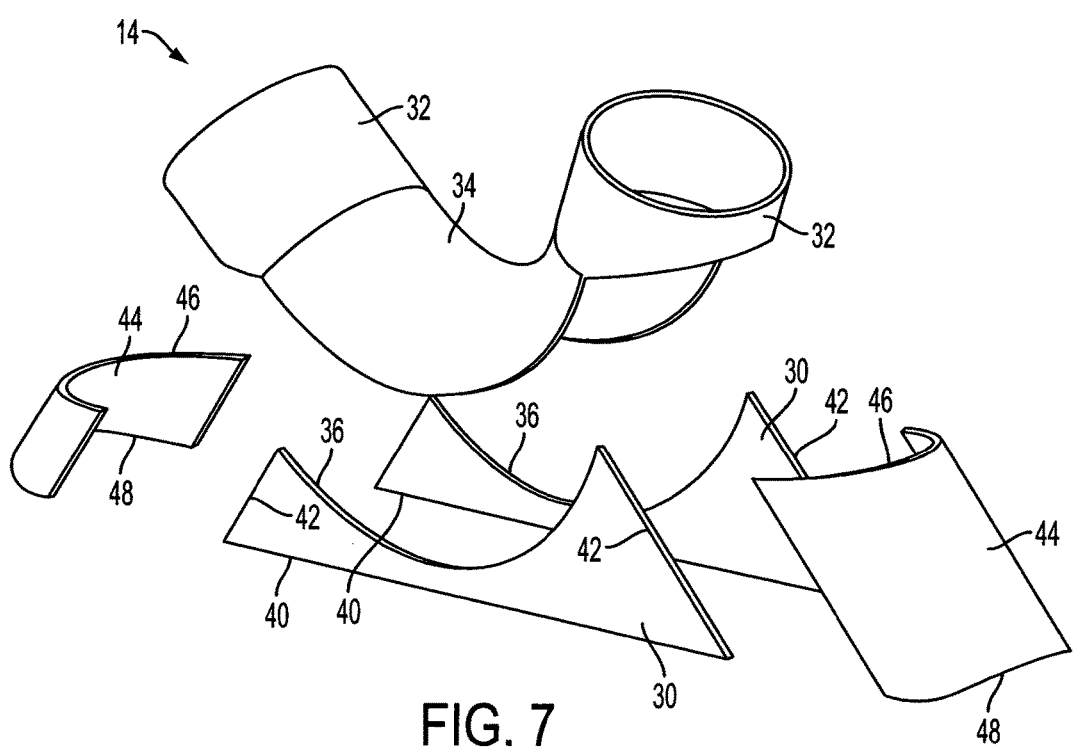
FIG. 7 is an exploded perspective view of a K-node structure corresponding to that shown in FIG. 6 but illustrating how certain parts may be integrated.

The exploded views of FIGS. 6 and 7 show the component parts of a K-node structure 14 shown in FIG. 4, if that K-node structure 14 is fabricated rather than cast. FIG. 6 shows that the tubular root formations 32 may be separate from the inner connecting wall 34 whereas FIG. 7 shows that the tubular root formations 32 may be integral with the inner connecting wall 34. The root formations 32 in both cases can simply be cut from a pipe but in FIG. 7, the root formations 32 and the inner connecting wall 34 are parts of the same bent pipe, from which an outer convex curve part is removed to fit the concave-curved inner edges 36 of the faces 30.

Figure 9:
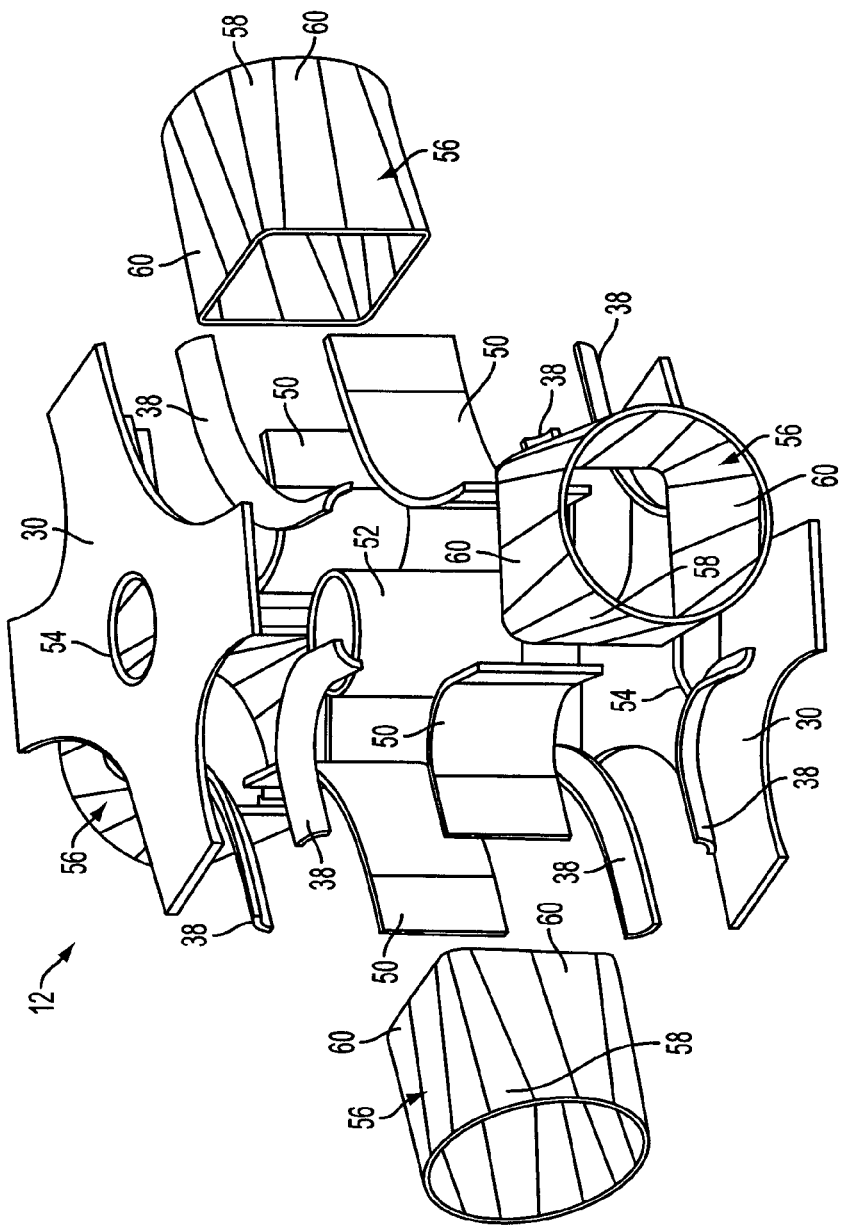
FIG. 9 is an exploded perspective view of the X-node structure of FIGS. 8(a), 8(b), 8(c) and 8(d), showing its component parts.

Turning now to FIGS. 8 and 9 of the drawings, these show the X-node structure 12 in more detail and, if fabricated, its component parts. The X-node structure 12 connects four convergent diagonal struts 26 of the lattice-frame jacket 10 and so comprises four root formations 32. The root formations 32 are tubular and have respective central longitudinal axes defining interior angles between each adjacent pair of root formations 32. There are four inner connecting walls 34, each of which joins the root formations 32 of a respective adjacent pair.

The inner connecting walls 34 of the X-node structure 12 have portions 38 of quarter-circular cross-section extending along opposite sides of a central concave-curved strip 50 of flat cross-section.

In the X-node structure 12, the faces 30 are also connected by an internal bulkhead spaced from the inner connecting walls. This bulkhead is defined by a tube 52 that extends between, and is welded, to the faces 30. The tube 52 lies on a central longitudinal axis orthogonal to, and at the intersection of, the central longitudinal axes of the root formations 32. Each face 30 is penetrated by a hole 54 aligned with the tube 52.

Each tubular root formation 32 of the X-node structure comprises a transition section 56 whose cross-section varies in an outward direction to terminate in a circular cross-section. As best shown in FIG. 9, each transition section 56 has outwardly-widening portions 58 of convex-curved cross-section that blend in to portions 38 of quarter-circular cross-section of the inner connecting walls 34. The outwardly-widening convex-curved portions 58 are joined by outwardly-narrowing, flat outer face portions 60.

FIGS. 10 to 14 illustrate manufacturing steps that may be employed to build a fabricated X-node structure 12 as shown in FIGS. 8 and 9. It will be apparent to the skilled reader where similar manufacturing steps can be taken when building a fabricated K-node structure 14 as shown in FIGS. 4 to 7.

Where the node structures 12, 14 are fabricated from metal parts, the faces 30 and the strips 50 may be defined simply by sheet or plate parts and the double-curved parts 34, 38 may be defined simply by being cut longitudinally from an inner concave curve of a bent pipe, as the manufacturing sequence of FIGS. 10 to 13 will now show.

Figure 10:
FIGS. 10 to 12 are a sequence of schematic side views showing a pipe being bent around a former, die or mandrel and then being divided longitudinally along its neutral axis into semi-circular sections.
Figure 12:
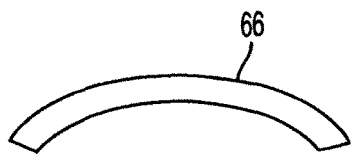
Figure 11:
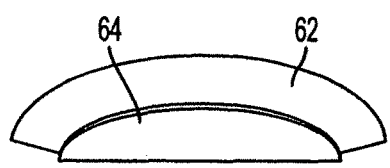
Figure 13:
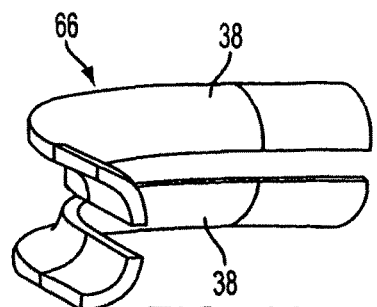
FIG. 13 is a perspective view showing a semi-circular section being further divided into quarter-circular sections suitable for use in fabricating the X-node structure shown in exploded form in FIG. 9.
Figure 14A:
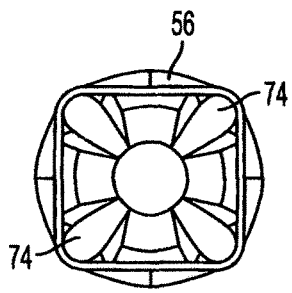
FIGS. 14(a), 14(b), 14(c), 14(d) and 14(e) are a selection of views of a tubular transition section of the X-node structure shown in exploded form in FIG. 9, in conjunction with a tool used to hot-forge the cross-sectional shape of that transition section.
Figure 14B:
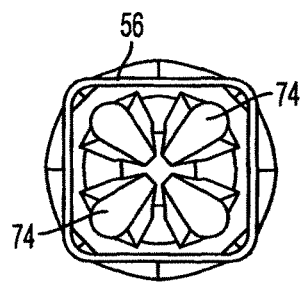
Figure 14C:
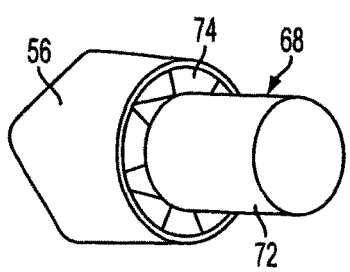
Figure 14D:
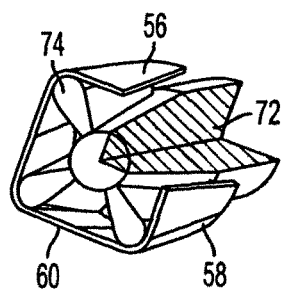
Figure 14E:
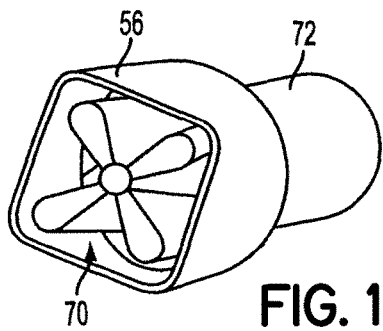

FIG. 10 shows a pipe 62 about to be bent around a curved former, die or mandrel 64 and FIG. 11 shows the pipe 62 after bending. FIG. 12 shows the pipe divided longitudinally along its neutral axis to produce an element 66 of semi-circular cross-section. FIG. 13 shows one such element 66 being further divided into elements of quarter-circular cross-section, both being suitable for use as an inner connecting wall portion 38 when fabricating the X-node structure 12 shown in exploded form in FIG. 9.

FIGS. 14(a) to 14(e) show a tubular transition section 56 of the X-node structure 12 shown in exploded form in FIG. 9, containing a tool 68 used to hot-forge the cross-sectional shape of that transition section 56. The tool 68 comprises a head 70 on a tapering central shaft 72, the head 70 having four lobes 74 equi-angularly spaced about the shaft 72 in cruciform cross-section.

The circumferential width of each lobe 74 tapers distally along the shaft 72. Specifically, the lobes 74 are relatively wide and hence close together at a proximal end of the head 70 where they define together a circular cross-section. Conversely, the lobes 74 are relatively narrow and hence further apart at a distal end of the head 70 where they define together a generally square cross-section with rounded corners. Each lobe 74 fits into a respective corner of the generally square cross-section, to define the outwardly-widening portions 58 of convex-curved cross-section of the tubular transition section 56, joined by the outwardly-narrowing, flat outer face portions 60.

FIGS. 15(a) and 15(b) show, respectively, simplified X-node structure and K-node structure variants 76, 78. FIGS. 16(a) and 16(b) show, respectively, further-simplified X-node structure and K-node structure variants 80, 82. As before, each node structure variant 76, 78, 80, 82 shown in FIGS. 15(a), 15(b), 16(a) and 16(b) has a pair of opposed spaced-apart faces 30 (only one of which is visible in these views) that are substantially planar and substantially parallel to each other. Also, each node structure 76, 78, 80, 82 has one or more pairs of root formations whose central axes diverge outwardly and converge inwardly between the faces 30.

In the case of the node structures 76, 78, 80, 82, the root formations are holes 84 with respective central axes defining an interior angle between them, for alignment with respective struts (not shown here) to be received in the holes. An inner connecting wall between each pair of holes 84 connects concave-curved inner edges 36 of the faces 30 and extends in a concave curve around the interior angle to join the root formations of that pair.

In FIGS. 15(a) and 15(b), an inner connecting wall 34 of semi-circular cross-section extends between the faces 30, with a radius of cross-sectional curvature the same as that of the holes 84 defining the root formations. These concave-curved inner connecting walls 34 are bounded by the concave-curved inner edges 36 of the faces 30.

In the even simpler variant shown in FIGS. 16(a) and 16(b), concave-curved inner connecting walls 86 have a flat cross-section to extend straight between concave-curved inner edges 36 of the opposed faces 30. The resulting holes 84 are rectangular, more specifically square, but transition sections could be added to the holes 84 for end-on welding to tubular struts of circular cross-section. Such transition sections could be similar to those shown in FIG. 9, but would not be identical to them because one end of the transition section would need to be of square cross-section to match the associated hole 84.

Many other variations are possible within the inventive concept. For example, a node structure of the invention may be integral with a leg portion and/or one or more strut root portions to which further leg sections and strut sections may be welded end-on to build a lattice frame.

Where the node structures are fabricated from metal parts, double-curved parts may be defined not only by cutting along a pipe or tube but instead by a bent or forged U- or C-section or by being cut longitudinally from an inner concave curve of a bent or forged U- or C-section.

The invention claimed is:

1. A method of fabricating a node structure for a lattice frame, the method comprising:
cutting a pair of faces from sheet or plate material so that each face has a concave-curved edge;
positioning the pair of faces in an opposed, spaced-apart arrangement: providing a concave-curved connecting wall;
connecting the pair of opposed spaced-apart faces with the concave-curved connecting wall by joining the connecting wall to the concave-curved edges of the faces: forming at least first and second transition sections that have a rectangular cross-section that varies in an outward direction to terminate in a circular cross-section; and connecting the first and second transition sections to opposing ends of the concave-curved connecting wall.

2. The method of claim 1, comprising the preliminary step of bending or forging a U- or C-section or cutting longitudinally along an inner concave curve of a bent tube or a bent or forged U- or C-section to define one or more double-curved parts of the concave-curved connecting wall.

3. A method of fabricating a node structure for a lattice frame, the method comprising:
cutting a pair of faces from sheet or plate material so that each face has a concave-curved edge;
positioning the pair of faces in an opposed, spaced-apart arrangement; providing a concave-curved connecting wall; connecting the pair of opposed spaced-apart faces with the concave-curved connecting wall by joining the concave-curved connecting wall to the concave-curved edges of the faces providing at least first and second root formations;
connecting the first root formation to a first end of the concave-curved connecting wall, and the second root formation to a second end of the concave-curved connecting wall;
providing first and second end connecting walls, each with inner edges and straight end edges;
connecting the first end connecting wall to a straight end edge of one of the pair of spaced-apart faces and also to the first root formation; and
connecting the second end connecting wall to a straight end edge of the other of the pair of opposed spaced-apart faces and also the second root formation.

4. The method of claim 3, comprising the preliminary step of bending or forging a U- or C-section or cutting longitudinally along an inner concave curve of a bent tube or a bent or forged U- or C-section to define one or more double-curved parts of the concave-curved connecting wall.

5. The method of claim 3, wherein positioning the pair of faces further comprises positioning the pair of faces substantially parallel to each others.

6. The method of claim 3 wherein providing the concave-curved connecting wall further comprises providing the concave-curved connecting wall having a concave curvature that follows an elliptical, parabolic or hyperbolic path between the first and second root formations.

7. The method of claim 3, wherein providing the concave-curved connecting wall further comprises providing at least one double-curved part of convex cross-section, when viewed externally, that extends around an interior angle and is bounded by at least one of the concave-curved edges of the faces.

8. The method of claim 7, wherein providing the at least one double-curved part further comprises providing the double-curved part that is part-toroidal.

9. The method of claim 7, wherein providing the at least one double-curved part further comprises providing the double-curved part that is of semi-circular, quarter-circular or other part-elliptical cross-section.

10. The method claim 9, wherein providing the first and second root formations further comprises providing the first and second root formations having radii of cross-sectional curvature substantially identical to a radius of cross-sectional curvature of the double-curved part.

11. The method of claim 7, further comprising connecting the double-curved part to the faces and bounding the double-curved part by concave-curved inner edges of both faces.

12. The method of claim 1, further comprising connecting the concave-curved connecting wall to a central concave-curved strip of flat cross-section bounded along each side by double-curved parts, each of which joins the concave-curved strip to a concave-curved inner edge of a respective face of the pair.

13. The method of claim 7, further comprising fabricating the node structure from metal parts, wherein the, or each, double-curved part is defined by a metal part of semi-circular or quarter-circular cross section.

14. The method of claim 3, further comprising providing each face with an outer edge opposed to the concave-curved edge, and end edges each diverging from the concave-curved edge to the outer edge.

15. The method of claim 3, wherein connecting the first and second end connecting walls further comprises connecting the faces are by end connecting walls outboard of the first and second root formations, each end connecting wall having an inner edge adjoining the respective root formation and an outer edge in continuity with the outer edges of the faces.

16. The method of claim 3, further comprising positioning the outer edges of the faces and the end connecting walls together define a seat recess shaped for joining the node structure to another member of the lattice frame.

17. The method of claim 16, wherein positioning the outer edges further comprises positioning the seat recess having a central longitudinal axis generally parallel with planes of the faces.

18. The method of claim 3, wherein connecting the first and second end connecting walls further comprises connecting the end connecting walls having a convex semi-circular or other part-elliptical cross-section extending between the faces.

19. The method of claim 3, wherein positioning the faces further comprises positioning the faces substantially parallel to a plane containing the central longitudinal axes of the first and second root formations.

20. The method of claim 1, further comprising:
connecting at least four root formations with respective central longitudinal axes defining interior angles between each adjacent pair of root formations; and
connecting at least four inner connecting walls, each joining the root formations of each respective adjacent pair.

21. The method of claim 1, further comprising connecting the faces by at least one internal bulkhead spaced from the inner connecting wall.

22. The method of claim 21, wherein the bulkhead comprises a tube extending between the faces on an axis substantially orthogonal to the central longitudinal axes of root formations.

23. The method of claim 3, wherein providing the first and second root formations further comprises at least one of the first and second root formations being tubular.

24. The method of claim 3, wherein providing the first and second root formations and the inner connecting wall further comprises bending a tube from which an outer convex curve part is removed to fit the concave-curved inner edges of the pair of opposed spaced-apart faces.

* * * * *